US012671516B2

(12) United States Patent
Yamazaki

(10) Patent No.: US 12,671,516 B2
(45) Date of Patent: Jun. 30, 2026

(54) DUMMY-LIGHT GENERATION DEVICE, OPTICAL TRANSMISSION SYSTEM, AND DUMMY-LIGHT GENERATION METHOD

(71) Applicant: NEC Corporation, Tokyo (JP)

(72) Inventor: Tatsuya Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 525 days.

(21) Appl. No.: 18/134,806

(22) Filed: Apr. 14, 2023

(65) Prior Publication Data

US 2023/0344543 A1 Oct. 26, 2023

(30) Foreign Application Priority Data

Apr. 21, 2022 (JP) ................................. 2022-069884

(51) Int. Cl.
| | |
|---|---|
| *H04J 14/02* | (2006.01) |
| *H04B 10/079* | (2013.01) |
| *H04B 10/516* | (2013.01) |

(52) U.S. Cl.
CPC .. *H04J 14/02212* (2023.08); *H04B 10/07955* (2013.01); *H04B 10/5161* (2013.01)

(58) Field of Classification Search
CPC ............ H04J 14/02212; H04J 14/0221; H04B 10/07955; H04B 10/5161; H04B 10/07; H04B 10/032; H04B 10/40; H04B 10/07957; H04Q 2011/0043; H04Q 11/0005; H04L 69/40
See application file for complete search history.

(56) References Cited

U.S. PATENT DOCUMENTS

| | | | |
|---|---|---|---|
| 2015/0043920 A1 | 2/2015 | Ji et al. | |
| 2018/0309535 A1* | 10/2018 | Nakamura | ......... H04B 10/2507 |
| 2020/0244386 A1* | 7/2020 | Yamamoto | ........... H04B 10/077 |
| 2020/0412475 A1* | 12/2020 | Nagai | ............... H04J 14/02212 |
| 2021/0194616 A1* | 6/2021 | Yamamoto | .......... H04J 14/0291 |

FOREIGN PATENT DOCUMENTS

| | | |
|---|---|---|
| JP | 2005-051596 A | 2/2005 |
| JP | 6780773 B | 11/2020 |
| WO | WO-2017168994 A1 * 10/2017 | .......... H04J 14/0291 |

OTHER PUBLICATIONS

JP Office Action for JP Application No. 2022-069884, mailed on Nov. 18, 2025 with English Translation.

* cited by examiner

*Primary Examiner* — Hibret A Woldekidan
(74) *Attorney, Agent, or Firm* — Sughrue Mion, PLLC

(57) ABSTRACT

The dummy-light generation device includes an ASE light source that generates ASE light, and a spectrum processing circuit that generates dummy light transmitted together with signal light by processing a spectrum of the ASE light, and the spectrum processing circuit processes the spectrum of the ASE light in advance in such a way that a spectrum of the dummy light and a spectrum of the signal light can be distinguished from each other on at least one of a frequency axis and a time axis on a reception side.

18 Claims, 13 Drawing Sheets

DUMMY-LIGHT GENERATION DEVICE 10

SPECTRUM PROCESSING UNIT 120

DUMMY-LIGHT GENERATION DEVICE, OPTICAL TRANSMISSION SYSTEM, AND DUMMY-LIGHT GENERATION METHOD

This application is based upon and claims the benefit of priority from Japanese Patent Application No. 2022-069884, filed on Apr. 21, 2022, the disclosure of which is incorporated herein in its entirety by reference.

TECHNICAL FIELD

The present invention relates to a dummy-light generation device and the like.

BACKGROUND ART

In general, in an optical submarine cable system, light (signal light) modulated based on user data or control data is transmitted in a plurality of carriers (optical carrier waves) having different wavelengths. The user data are data relating to a user of the system. The control data are data to be used by an operator of the system for monitoring or controlling the system. A plurality of pieces of the signal light are subjected to wavelength multiplexing, and thus a wavelength division multiplexed optical signal (hereinafter, referred to as "WDM signal") is generated. The WDM signal is transmitted through a submarine cable.

When an optical amplifier used in the optical submarine cable system is operated under a preferred condition, it is required to maintain power of a transmitted WDM signal within a predetermined range. There has been known a technique in which dummy light is inserted into a wavelength band having no inserted signal light in order to maintain the power of the WDM signal within the predetermined range. By inserting dummy light into the WDM signal, even when the number of carriers included in the signal light (in other words, the number of wavelengths of the signal light) is increased or reduced, or a power variation occurs in part of the signal light, the power of the WDM signal can be maintained within the predetermined range.

In reference to the present invention, Patent Literature (PTL) 1 describes an optical transmission device including an ASE dummy-light generation device and a signal-light generation device.

[PTL 1] Japanese Unexamined Patent Application Publication No. 2005-051596

SUMMARY

In the technique described in PTL 1, a WDM signal into which dummy light is inserted includes one or more pieces of signal light and one or more pieces of dummy light that are subjected to wavelength multiplexing. A screen of a spectrum analyzer to which the WDM signal is input is observed, and thus wavelengths allocated to the signal light and the dummy light can be recognized. A general spectrum analyzer is capable of displaying a spectrum of the WDM signal including the signal light and the dummy light.

However, in general, a spectrum shape of the signal light and a spectrum shape of the dummy light that are observed with the spectrum analyzer are similar to each other. Thus, when the WDM signal is observed with the spectrum analyzer, there is a problem that it is difficult to distinguish the signal light and the dummy light from each other.

An exemplary object of the invention is to provide a technique for facilitating distinction between signal light and dummy light that are included in a WDM signal.

A dummy-light generation device according to an exemplary embodiment of the present invention includes: an amplified spontaneous emission (ASE) light source that generates ASE light; and a spectrum processing means that extracts, from a spectrum of the ASE light, a wavelength band with no signal light and generates dummy light, wherein the spectrum processing means processes a spectrum of the dummy light in advance in such a way that, in a mixed spectrum including the dummy light and the signal light, the dummy light and the signal light can be distinguished from each other on at least one of a frequency axis and a time axis.

A dummy-light generation method according to an exemplary embodiment of the present invention is a dummy-light generation method of: generating ASE light; and extracting, from a spectrum of the ASE light, a wavelength band with no signal light and generating dummy light, and includes a procedure of processing a spectrum of the dummy light in advance in such a way that, in a mixed spectrum including the dummy light and the signal light, the dummy light and the signal light are distinguished from each other on at least one of a frequency axis and a time axis.

Advantageous Effects of Invention

The dummy-light generation device and the like according to the present invention exert an effect of facilitating distinction between the signal light and the dummy light that are included in the WDM signal.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
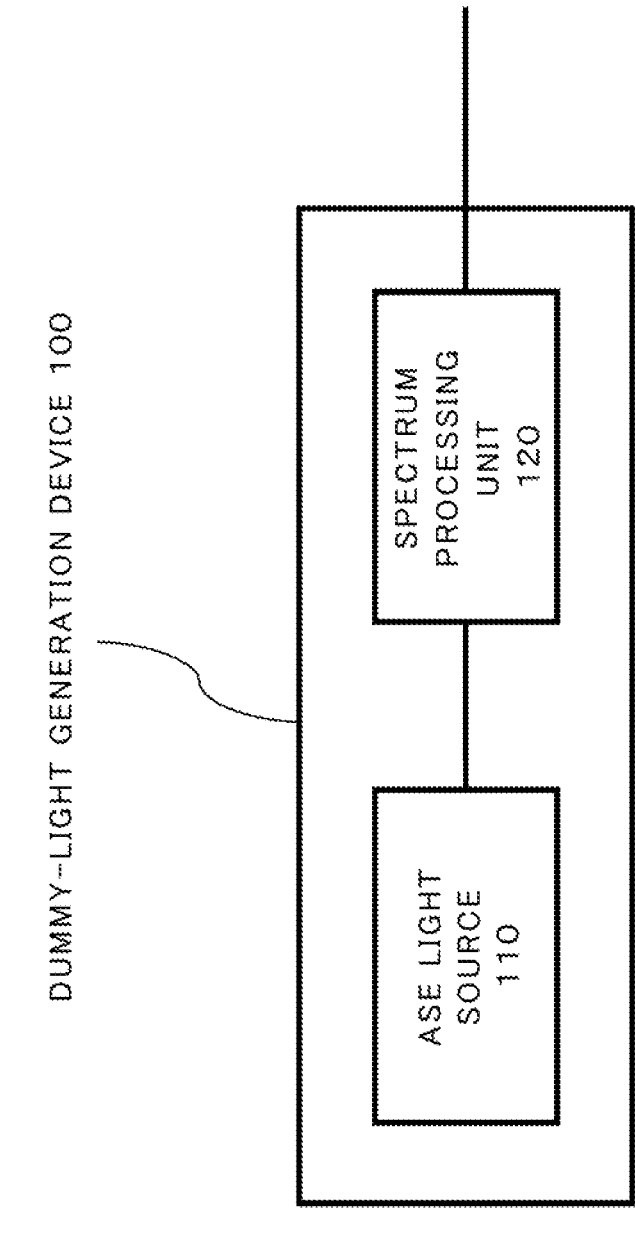
FIG. 1 is an exemplary block diagram illustrating a configuration example of a dummy-light generation device of a first example embodiment.

Next, a detailed explanation will be given for a first example embodiment with reference to the drawings.

Example embodiments of the present invention are described below. Arrows in the drawings are given as examples for describing directions of a signal in the example embodiments, and are not intended to limit the directions. Further, intersections of lines do not indicate coupling of signals in different directions or the like unless otherwise noted. Aforementioned elements are referred to as the identical names and denoted with the identical reference symbols, and overlapping description therefor is omitted in each of the example embodiments.

First Example Embodiment

FIG. 1 is an exemplary block diagram illustrating a configuration example of a dummy-light generation device 100 of a first example embodiment of the present invention. The dummy-light generation device 100 includes an ASE light source 110 and a spectrum processing unit 120.

The ASE light source 110 generates ASE light. ASE is an abbreviation for Amplified Spontaneous Emission. The ASE light is generated by, for example, injecting excitation light into an optical amplification medium.

In general, a spectrum of light can be expressed with a frequency as a horizontal axis and intensity of the spectrum as a vertical axis. Further, when a time axis is added to the horizontal axis, a temporal variation of the intensity of the spectrum can be expressed. The spectrum processing unit 120 processes a spectrum of the ASE light generated by the ASE light source 110 on at least one of the frequency axis and the time axis, and thus generates dummy light. The dummy light is light transmitted together with signal light. The spectrum processing unit 120 extracts, from the spectrum of the ASE light, a wavelength band with no signal light, and generates the dummy light. Herein, the spectrum processing unit 120 processes the spectrum of the ASE light in advance in such a way that, in a spectrum including the dummy light and the signal light, a spectrum of the dummy light can be distinguished from a spectrum of the signal light on at least one of the frequency axis and the time axis. Herein, the wavelength band with no signal light indicates a wavelength band to which the signal light is not allocated. The spectrum processing unit 120 is one mode of a spectrum processing means. Note that the frequency axis relating to the light spectrum can easily be converted into a wavelength axis and displayed. Further, in the following description, the light spectrum including the dummy light and the signal light is referred to as a "mixed spectrum". A spectrum of a WDM signal acquired through subjecting the dummy light and the signal light to wavelength multiplexing is one mode of the mixed spectrum.

The dummy-light generation device 100 thus configured facilitates distinction between the signal light and the dummy light in the mixed spectrum of the WDM signal including the signal light and the dummy light. This is because the dummy-light generation device 100 processes the spectrum of the ASE light in advance on at least one of the frequency axis and the time axis, and thus a device that receives the WDM signal is able to distinguish the signal light and the dummy light from each other, based on presence or absence of the processing.

Second Example Embodiment

Figure 2:
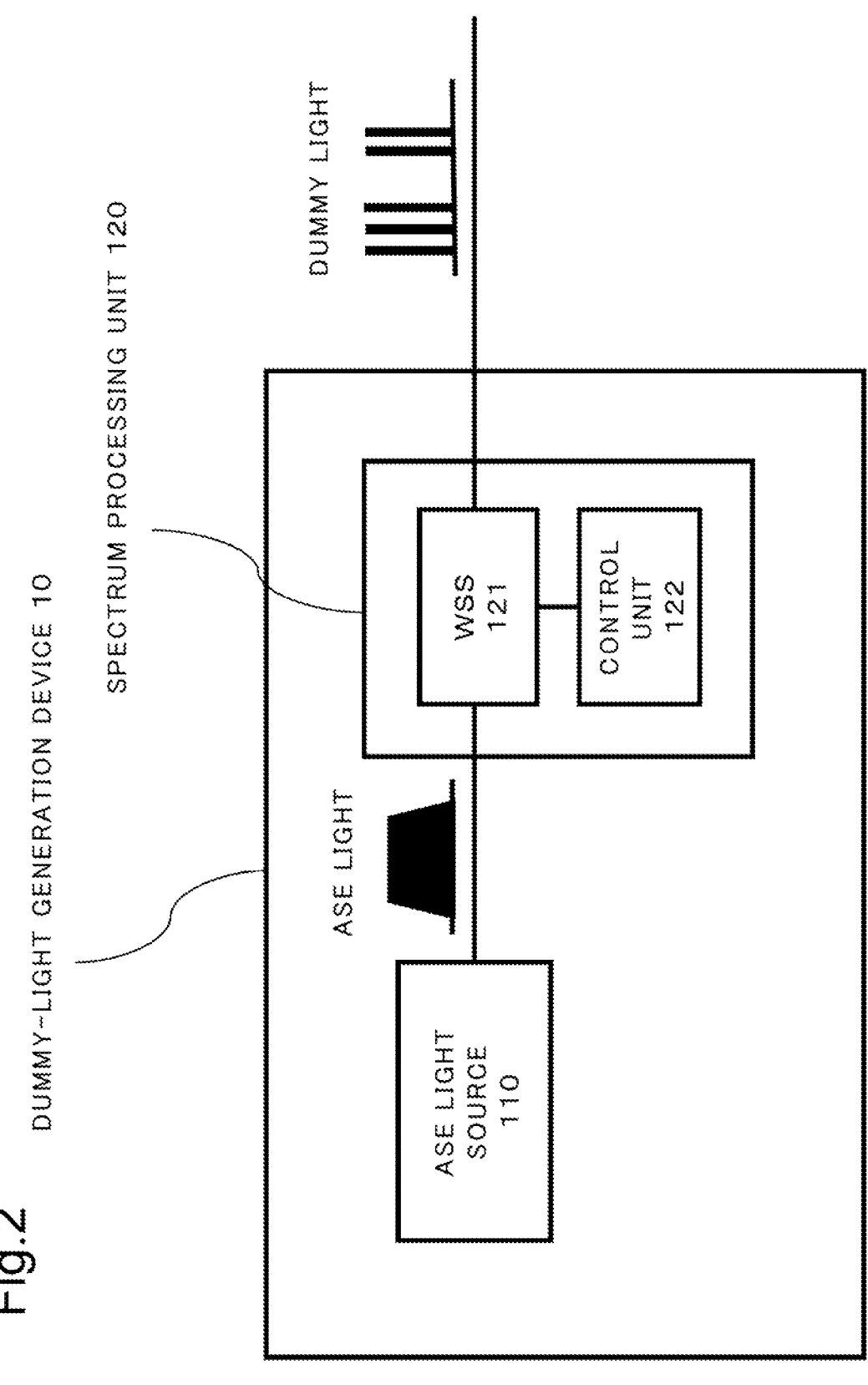
FIG. 2 is an exemplary block diagram illustrating a configuration example of a dummy-light generation device of a second example embodiment.

FIG. 2 is an exemplary block diagram illustrating a configuration example of a dummy-light generation device 10 of a second example embodiment of the present invention. In FIG. 2, the spectrum processing unit 120 includes a wavelength selective switch (WSS) 121 and a control unit 122. The WSS 121 filters input light with parameters such as a transmission wavelength, a transmission band, and an attenuation amount that are set based on an instruction from the control unit 122. A general configuration and function of the WSS 121 are publicly known. The control unit 122 is an electric circuit, and outputs, to the WSS 121, an electric signal for setting the parameter of the WSS 121. The control unit 122 sets the parameter of the WSS 121 in response to an operation of an operator of the dummy-light generation device 10 or a control signal from the outside of the dummy-light generation device 10. In other words, the spectrum processing unit 120 of the present example embodiment processes the spectrum of the ASE light in advance in such a way that, on the side receiving the WDM signal including the dummy light and the signal light, the spectrum of the dummy light and the spectrum of the signal light can be distinguished from each other on the frequency axis.

In general, the WDM signal includes a plurality of slots having predetermined band widths, and an independent channel is allocated to each of the slots. A width and a center frequency of the channel and a channel interval are defined in the specification of the system. For example, the width of the channel is 37.5 GHZ, 50 GHZ, or the like, and the channel interval is defined between 37.5 GHz and 500 GHz. Channel numbers may be provided in such a way as to distinguish the plurality of channels included in the WDM signal. When the dummy light is generated for each of the plurality of channels, the peak shape of the spectrum of the dummy light on the frequency axis may be identical or different for each of channels. The shape of the spectrum of the dummy light is only required to be distinguishable from the shape of the spectrum of the signal light.

In FIG. 2, the WSS 121 filters the ASE light, and outputs the plurality of pieces of the dummy light having independent peaks for empty slots. The WSS 121 is set to output only dummy light having a wavelength of an empty slot in such a way that the dummy light is inserted into a channel with no signal light (empty slot). For example, the WSS 121 is capable of setting an attenuation amount of input light for each band width equal to or more than 3.125 GHZ. In other words, the WSS 121 is capable of setting a transmittance of input light for each band width equal to or more than 3.125 GHZ. Thus, the WSS 121 is capable of processing a waveform of the spectrum of the input ASE light for each set band width equal to or more than 3.125 GHZ.

Figure 3:
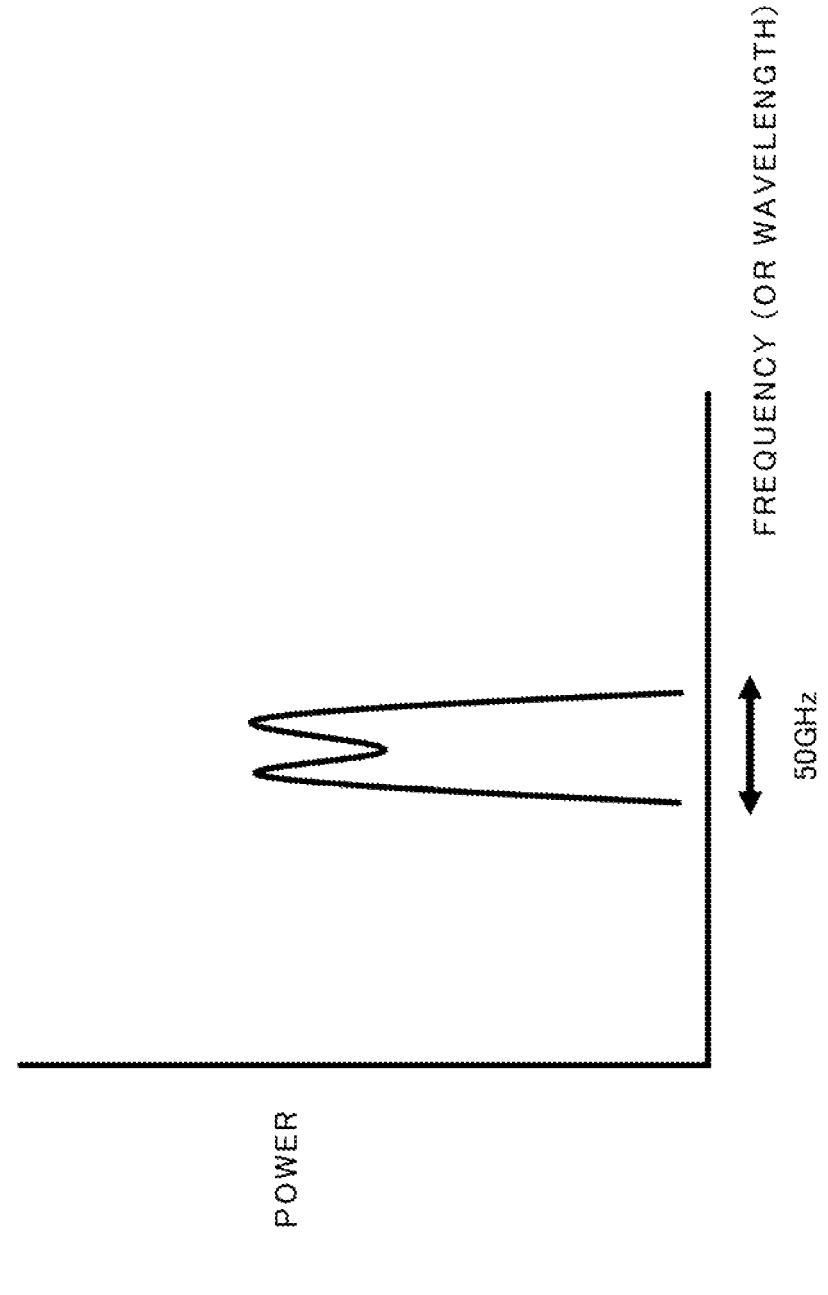
FIG. 3 is an exemplary diagram illustrating an example of a spectrum of dummy light that is output from a WSS.

FIG. 3 is an exemplary diagram illustrating an example of the spectrum of the dummy light that is output from the WSS 121. In FIG. 3, a frequency or a wavelength of the light is indicated with the horizontal axis, and power thereof is indicated with the vertical axis. When the attenuation amount of the WSS 121 is set in such a way that a projection and a recess are given in a certain channel for about every 17 GHz being about one third of 50 GHZ, the spectrum of the dummy light in the channel that is output from the WSS 121 is as illustrated in, for example, FIG. 3. FIG. 3 illustrates a characteristic example of the spectrum of the dummy light.

The shape of the spectrum of the dummy light is deformed in this manner, and thus light having a spectrum shape acquired after processing at the WSS 121 can easily be distinguished as the dummy light by an operator when the spectrum of the WDM signal is measured through use of a spectrum analyzer.

Figure 4:
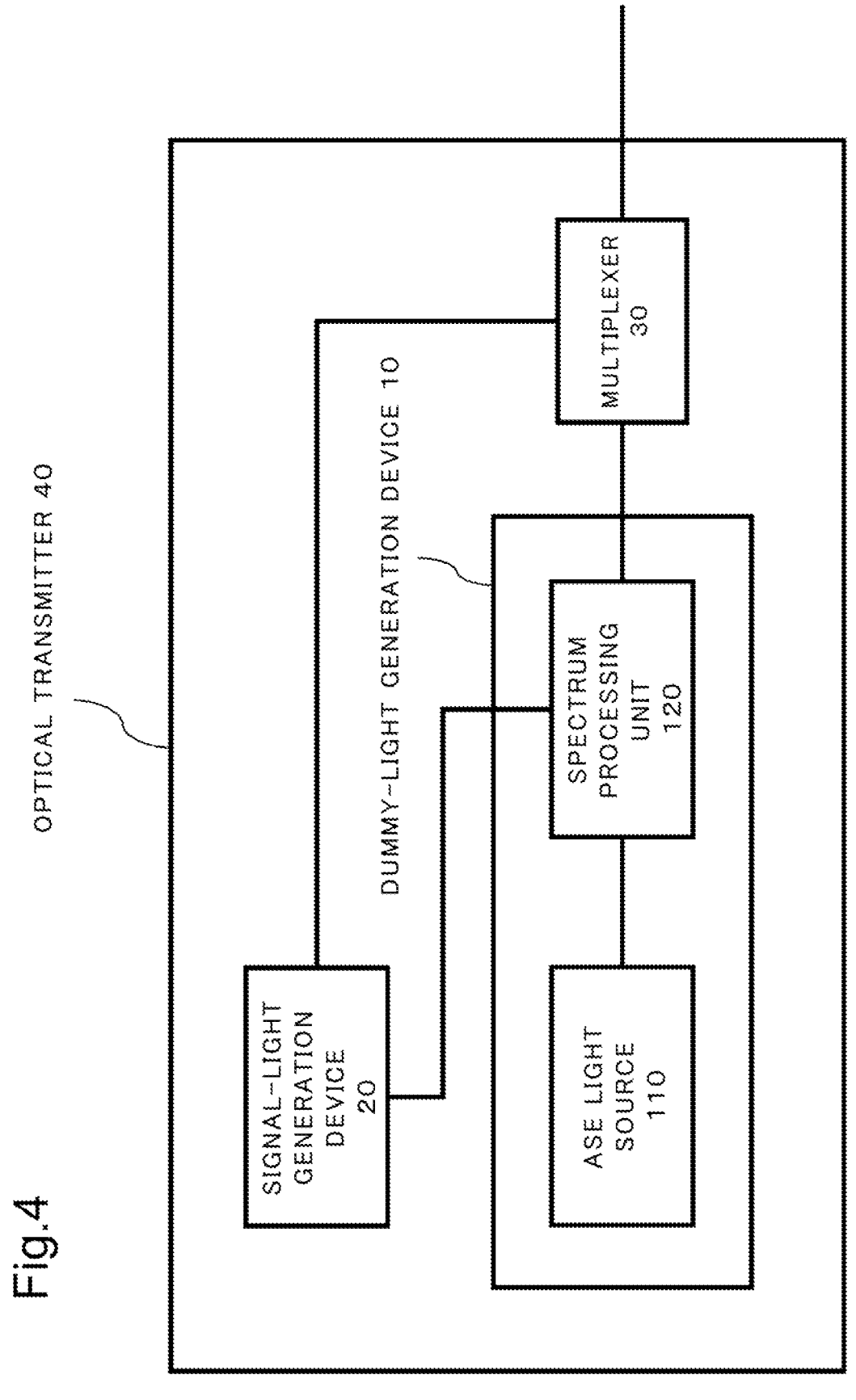
FIG. 4 is an exemplary diagram illustrating a configuration example of an optical transmitter of the second example embodiment.

FIG. 4 is an exemplary diagram illustrating a configuration example of an optical transmitter 40 of the second example embodiment. The optical transmitter 40 includes a signal-light generation device 20 and a multiplexer 30, in addition to the dummy-light generation device 10 described in FIG. 2. The signal-light generation device 20 generates signal light including a plurality of carriers that is modulated based on user data or control data. The user data and the control data may be input from the outside of the optical transmitter 40 to the signal-light generation device 20. The multiplexer 30 is an optical filter. The multiplexer 30 subjects an output (signal light) of the signal-light generation device 20 and an output (dummy light) of the dummy-light generation device 10 to wavelength multiplexing. The multiplexer 30 subjects the signal light and the dummy light to wavelength multiplexing, and outputs the resultant as the WDM signal to the outside of the optical transmitter 40. Note that an optical coupler may be used in place of the multiplexer 30. An optical directional coupler may be used as the optical coupler.

The dummy-light generation device 10 generates the dummy light having a wavelength that does not overlap with the signal light. The signal-light generation device 20 may notify the spectrum processing unit 120 of information relating to a channel allocated to the signal light (in other words, information relating to a wavelength allocated to the signal light). The spectrum processing unit 120 may generate the dummy light in a channel other than the channel allocated to the signal light, based on the notified information. Further, the spectrum processing unit 120 may set power of the dummy light, based on the notified information, in such a way that total power of the generated dummy light falls within a first range. The first range may be set in such a way that, even when the number of slots allocated to the signal light varies, total power of the WDM signal may be power falling within a second range. For example, the dummy light may be generated in such a way that total power of the WDM signal in a band is constant.

The spectrum processing unit 120 may store a table as data that indicate association between the information relating to a slot allocated to the signal light and the total power of the dummy light. The spectrum processing unit 120 may refer to the table through use of the information notified from the signal-light generation device 20, and may control an attenuation amount of the WSS 121 for each band width in such a way that the total power of the dummy light falls within the first range.

Figure 5:
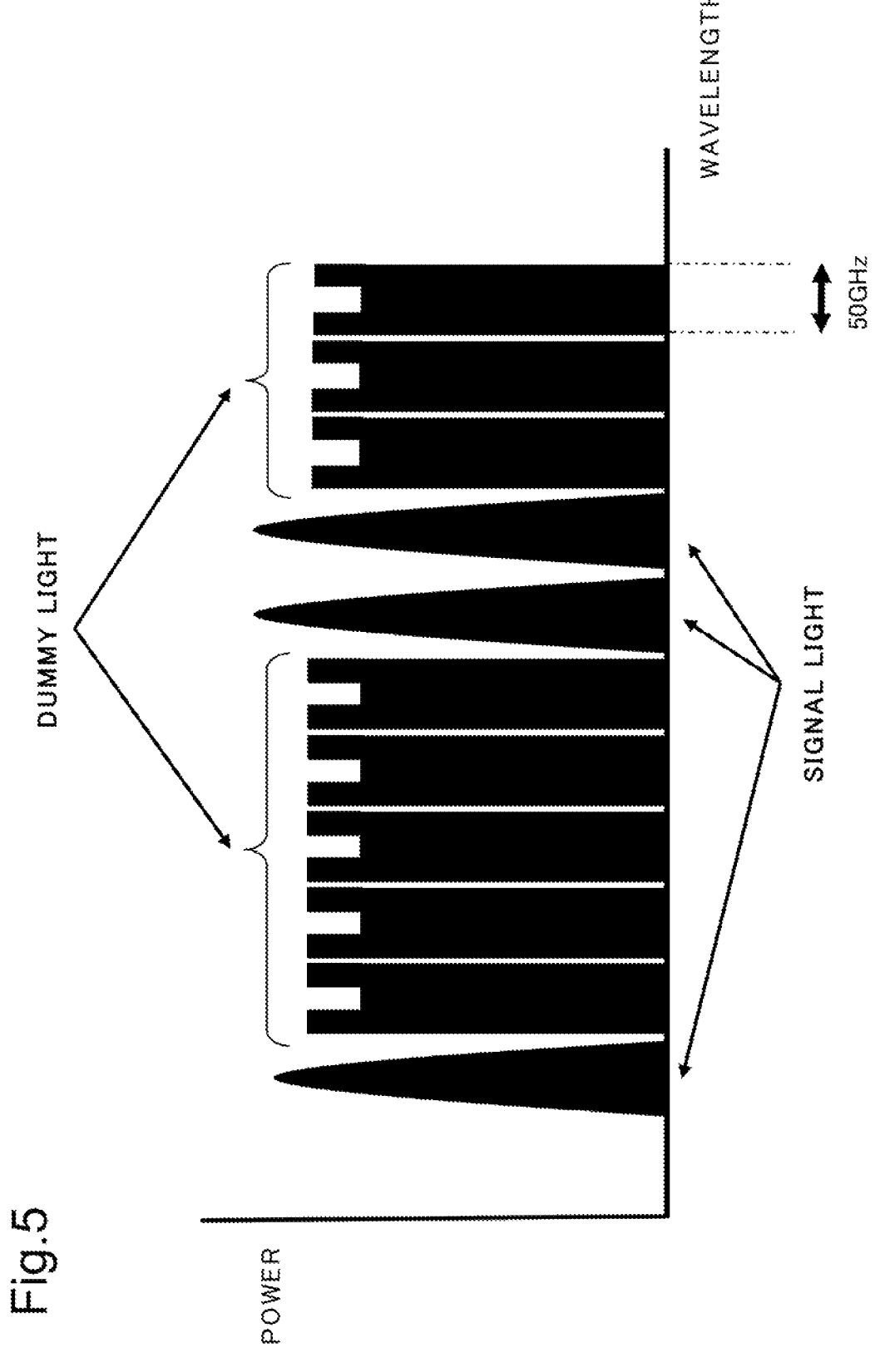
FIG. 5 is an exemplary diagram illustrating an example of a spectrum of a WDM signal.

FIG. 5 is an exemplary diagram illustrating an example of the spectrum of the WDM signal output from the optical transmitter 40. FIG. 5 describes a spectrum shape of the dummy light, which is described in FIG. 3, as a linearly-structured shape, as an example. In a case of the WDM signal illustrated in FIG. 5, three channels are allocated to the signal light, and eight channels are allocated to the dummy light. The spectrum of the dummy light has a shape recessed at the center for each slot. In other words, the spectrum shape of the dummy light is processed in advance by the spectrum processing unit 120 in such a way as to be distinguishable from the signal light. Thus, an operator can easily distinguish the signal light and the dummy light from each other at the time of observing the spectrum of the WDM signal with a spectrum analyzer.

Figure 6:
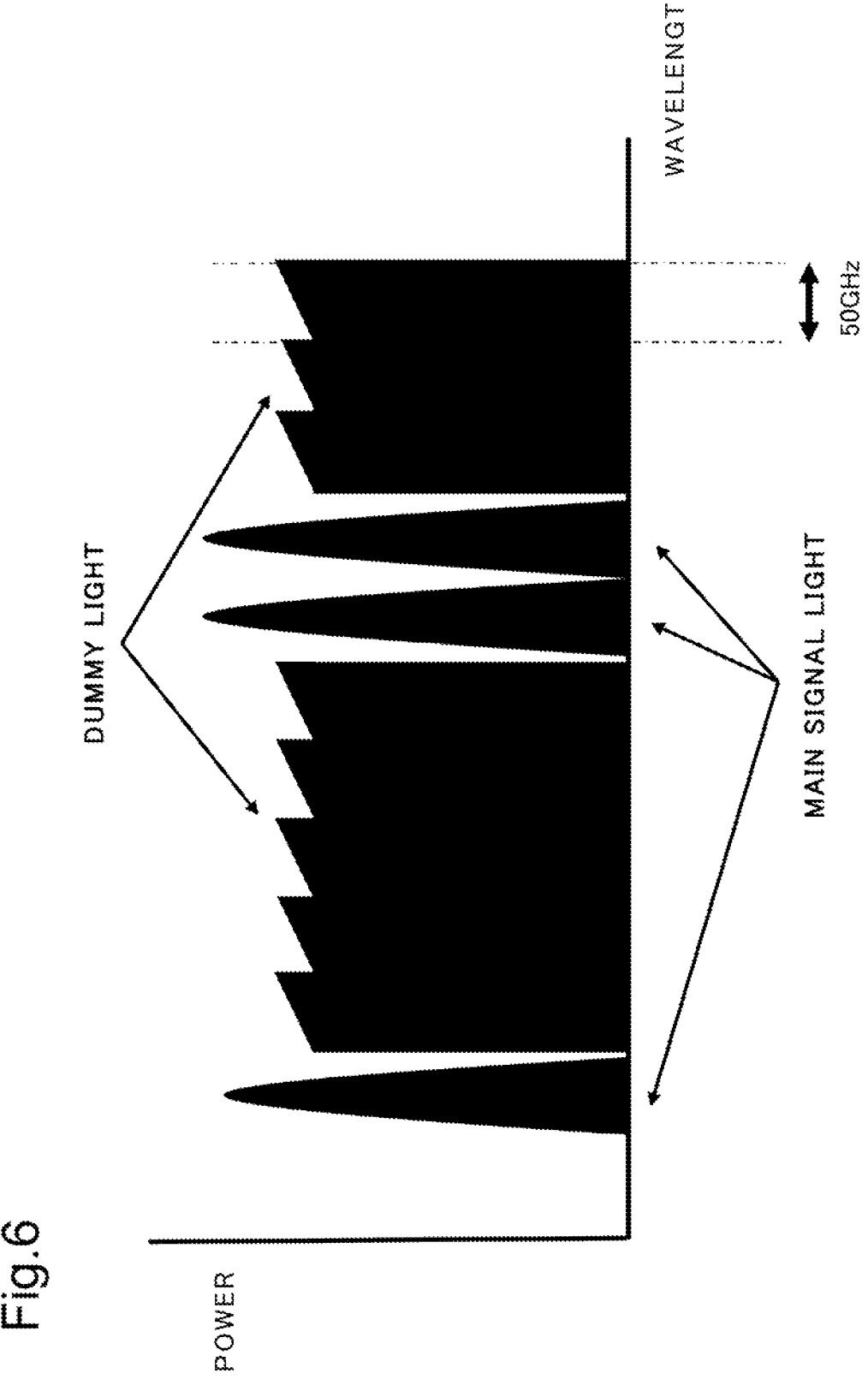
FIG. 6 is an exemplary diagram illustrating another example of the spectrum of the WDM signal.

FIG. 6 is an exemplary diagram illustrating another example of the spectrum of the WDM signal output from the optical transmitter 40. In FIG. 6, the power of the dummy light is higher as the wavelength is longer in a channel having a width of 50 GHZ. When a minimum width of a transmission band that can be set for the WSS 121 is sufficiently small, the power of the dummy light can also be changed relatively smoothly on the wavelength axis as in FIG. 6. Even when the minimum band width that can be set for the WSS 121 is not relatively smaller than the channel width, the power of the dummy light is set to be gradually higher (or lower), and thus the dummy light can be provided with a spectrum shape that can easily be distinguished from the signal light.

Further, as illustrated in FIG. 6, when the dummy light is arranged in both adjacent channels, the spectrum processing unit 120 may process the spectrum of the ASE light in such a way that the spectrum of the dummy light is integrated over the adjacent channels. In other words, the spectrum of the dummy light in the adjacent channels may be continuous.

Figure 7:
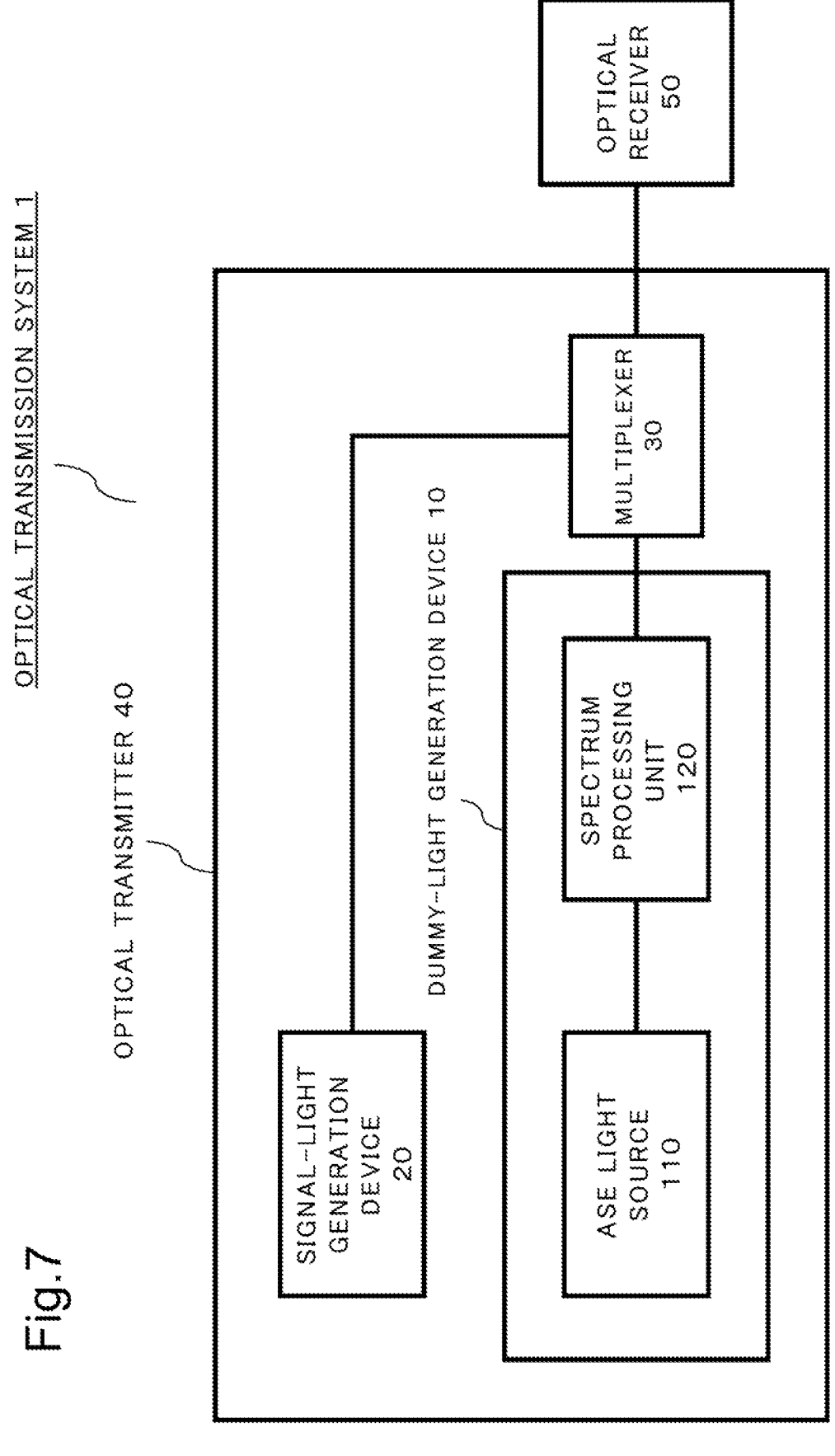
FIG. 7 is an exemplary block diagram illustrating a configuration example of an optical transmission system of the second example embodiment.

FIG. 7 is an exemplary block diagram illustrating a configuration example of an optical transmission system 1 of the second example embodiment of the present invention. The optical transmission system 1 includes the optical transmitter 40 and an optical receiver 50. The WDM signal output from the optical transmitter 40 propagates through an optical transmission path such as an optical fiber, and is received by the optical receiver 50.

The optical receiver 50 receives the WDM signal including the signal light and the dummy light. The optical receiver 50 extracts information for distinguishing the signal light and the dummy light from each other (hereinafter, referred to as "distinction information") from a spectrum difference in the received WDM signal (received light). The spectrum shape of the dummy light exemplified in FIGS. 3, 5, and 6 is an example of the distinction information. In other words, the optical receiver 50 measures the spectrum of the WDM signal having the mixed spectrum, and determines the light containing the distinction information as the dummy light. The optical receiver 50 is one mode of an optical reception means. The optical receiver 50 may be provided to another terminal station with respect to a terminal station provided with the optical transmitter 40. The optical transmitter 40 and the optical receiver 50 may be connected via an optical submarine cable. The optical receiver 50 may include a function of separating the signal light from the WDM signal and demodulating the user data or the control data.

Alternatively, the optical receiver 50 may be provided to a terminal station being the terminal station provided with the optical transmitter 40. In this case, the optical receiver 50 may be used as a monitoring device that splits and receives part of the WDM signal transmitted from the optical transmitter 40 and monitors the spectrum of the WDM signal transmitted from the optical transmitter 40.

Figure 8:
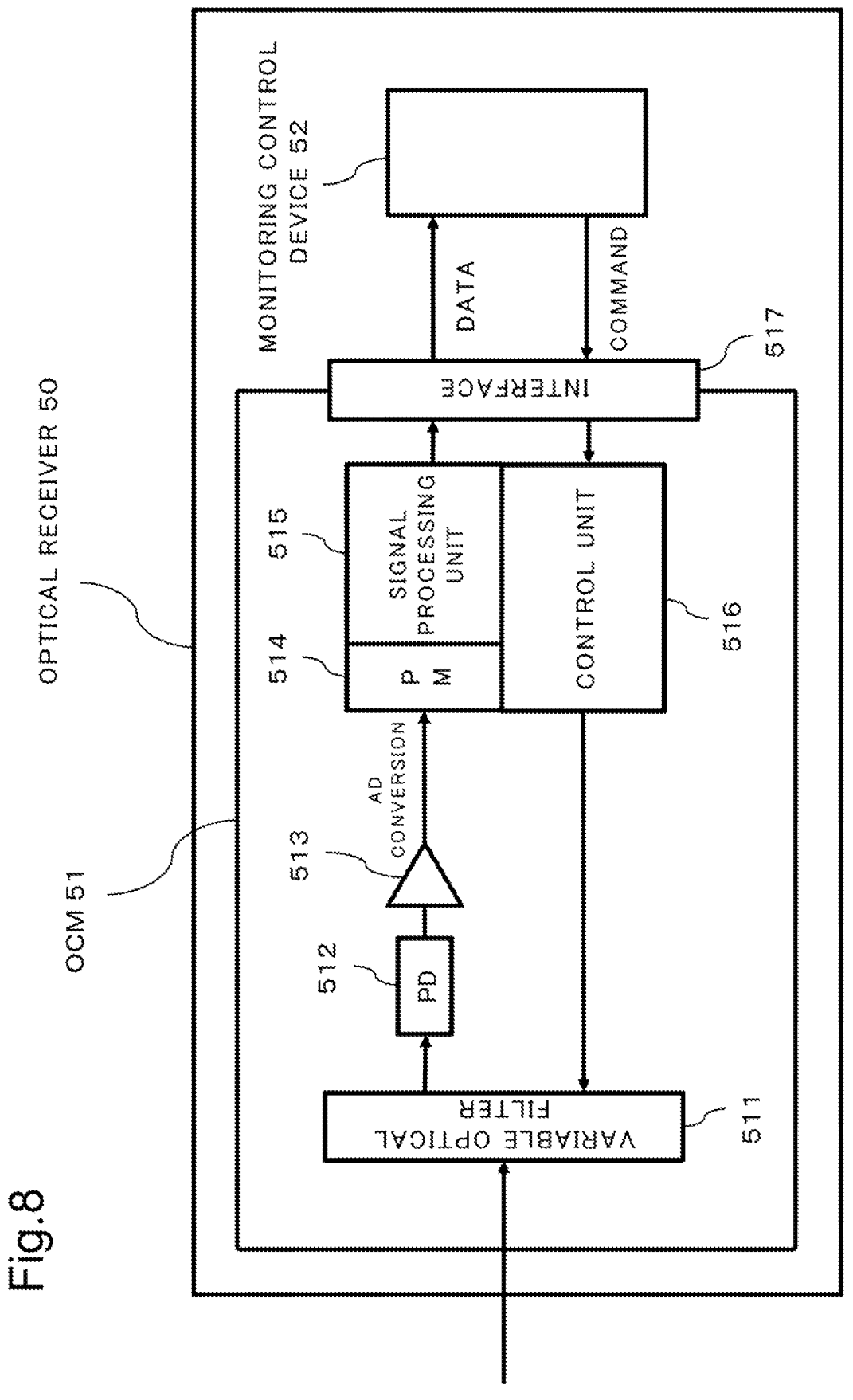
FIG. 8 is an exemplary block diagram illustrating a configuration example of an optical receiver.

FIG. 8 is an exemplary block diagram illustrating a configuration example of the optical receiver 50 used in the optical transmission system 1 in FIG. 7. The optical receiver 50 includes an optical channel monitor (OCM) 51 and a monitoring control device 52. The OCM 51 outputs data indicating the spectrum of the input WDM signal (hereinafter, referred to as "spectrum data") to the monitoring control device 52, under an instruction from the monitoring control device 52. The monitoring control device 52 displays the spectrum data input from the OCM 51 as a waveform or a letter on a display screen or the like. In other words, the OCM 51 and the monitoring control device 52 implements a function as a spectrum analyzer.

The OCM 51 includes a variable optical filter 511, a photo detector (PD) 512, an analog-to-digital (AD) conversion unit 513, a power monitor (PM) 514, a signal processing unit 515, and a control unit 516. The variable optical filter 511 is an optical filter with a variable transmission wavelength. A transmission wavelength and a transmission band width of the variable optical filter 511 is set under an instruction (command) transmitted from the control unit 516. For example, the PD 512 is a photo diode, and generates an electric signal having an amplitude associated with power of the light passing through the variable optical filter. An output from the PD 512 is converted into a digital signal by the AD conversion unit 513. The PM 514 is a power monitor, and acquires, from the AD converted signal, power of the light input to the PD 512. The signal processing unit 515 outputs the spectrum data to the monitoring control device 52 via an interface 517. The interface 517 is an interface provided to the OCM 51 for connecting a communication path between the OCM 51 and the monitoring control device 52. The interface 517 may include an electric or optical connector. Further, the interface 517 may include a conversion circuit that executes physical or logical conversion of a format of a signal transmitted between the OCM 51 and the monitoring control device 52.

The spectrum data are data in which the power acquired by the PM 514 and a transmission band of the variable optical filter 511 at the time of acquiring the power are associated with each other. Each of the PM 514, the signal processing unit 515, and the control unit 516 is an electric circuit such as large-scale integration (LSI). Those functions of the electric circuit may be implemented by a central processing unit (CPU) or a digital signal processor (DSP).

Further, the spectrum data generated by the OCM 51 may be transmitted to another device via the interface 517. The other device is, for example, a network management system (NMS) that manages a plurality of transmission systems. The NMS acquires, from an OCM installed in each of a plurality of optical receivers, the spectrum data relating to the WDM signal that is received by each optical receiver. The NMS as described above is used, and thus the spectrum of the WDM signal that is transmitted in each of the plurality of transmission systems can be acquired and monitored remotely with one NMS.

The monitoring control device 52 outputs, to the OCM 51, a request signal being a command for requesting the spectrum data relating to the WDM signal that is input to the OCM 51. In response to an input of the request signal, the control unit 516 of the OCM 51 scans a transmission band of the variable optical filter 511 over a band of the WDM signal. For example, the frequency band of the WDM signal is, but not limited, from 191.3 THz (1568.2 nm) to 196.1 THz (1529.8 nm). A band width (slice width) for each scanning is preferably narrow enough to detect a difference between the spectrum shapes of the signal light and the dummy light, and is 6.25 GHZ, for example. In this case, the variable optical filter 511 performs scanning for the WDM signal for about 800 times while shifting a transmission band by a width of 6.25 GHZ. With this, the signal processing unit 515 is capable of generating the spectrum data as a result of performing scanning from 191.3 THz to 196.1 THz.

The monitoring control device 52 outputs the spectrum data input from the interface of the OCM 51, in a format that can be recognized by an operator. The monitoring control device 52 may include a display screen, and may visually display the spectrum of the WDM signal while expressing the spectrum data with a frequency or a wavelength as a horizontal axis and power as a vertical axis. In this case, as in the modes illustrated in FIGS. 5 and 6, the monitoring control device 52 displays the spectrum of the WDM signal on the display screen.

Herein, a signal processing unit of the OCM 51 may determine whether the spectrum shape of the WDM signal matches with the shape of the dummy light for each channel at the time of generating scanning data, and may add, to the spectrum data, the determination result in association with a channel number. When the spectrum data include the determination result, the monitoring control device 52 may display the spectrum that is determined as the dummy light in the channel by a means different from that for the signal light. For example, the monitoring control device 52 may display the spectrum of the dummy light in a color different from that for the signal light. Alternatively, a line indicating the spectrum of the dummy light may be a broken line or a flashing line on the display screen. The monitoring control device 52 may display only the dummy light or only the signal light on the display screen. In this manner, different display methods are used for the dummy light and the signal light, and thus an operator can easily distinguish the dummy light and the signal light from each other on the display screen even when it is difficult for an operator to visually recognize a difference between the spectrum shapes.

The dummy-light generation device 10, the optical transmitter 40, and the optical transmission system 1 that are described in the second example embodiment facilitate distinction between the signal light and the dummy light included in the WDM signal. This is because the dummy-light generation device 10 processes the spectrum of the ASE light in advance on the frequency axis, and thus the device that receives the WDM signal including the signal light and the dummy light is able to distinguish the signal light and the dummy light from each other, based on presence or absence of the processing.

Third Example Embodiment

Figure 9:
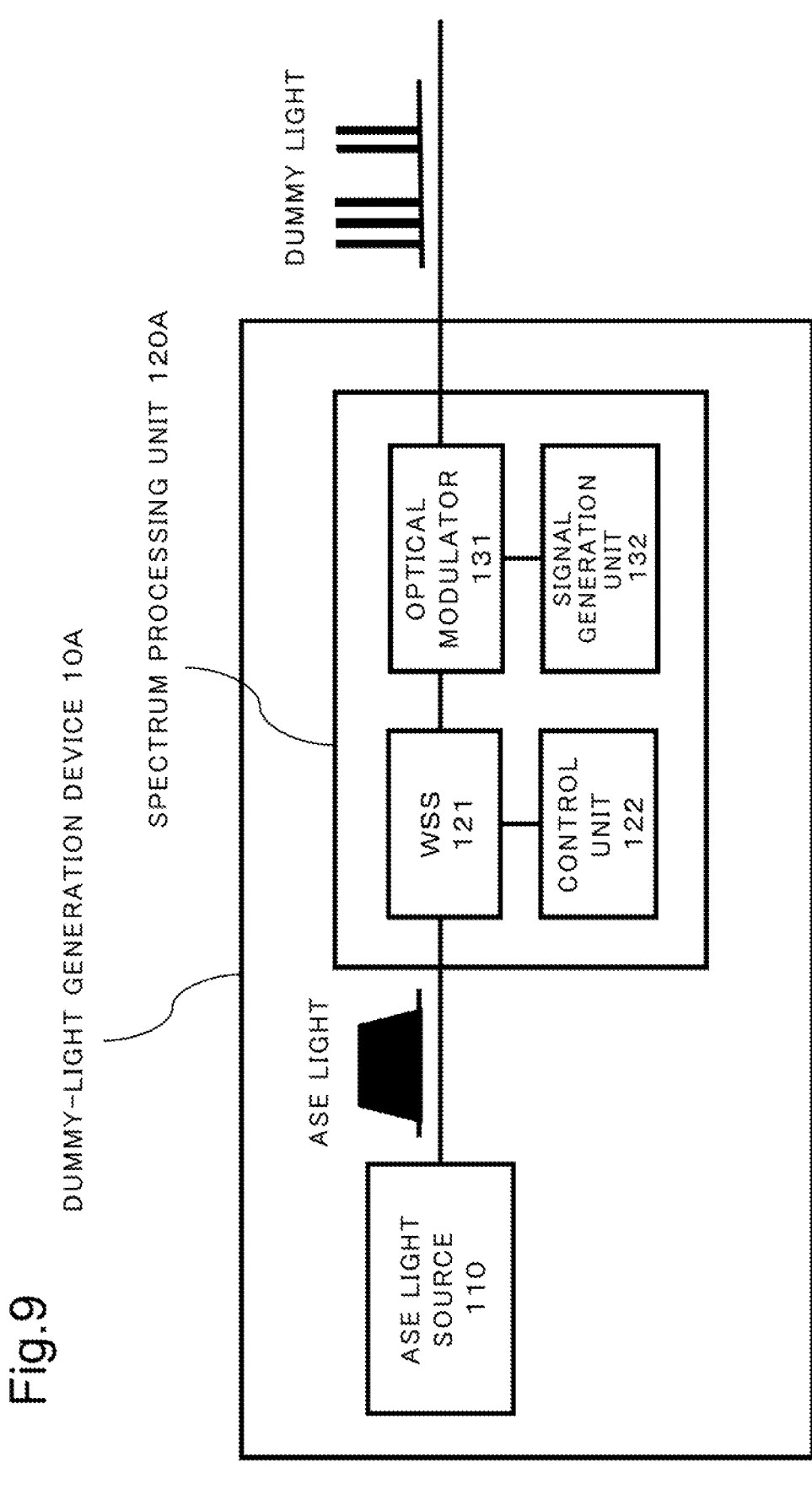
FIG. 9 is an exemplary block diagram illustrating a configuration example of a dummy-light generation device of a third example embodiment.

FIG. 9 is an exemplary block diagram illustrating a configuration example of a dummy-light generation device 10A of a third example embodiment. As compared to the spectrum processing unit 120 in FIG. 2, a spectrum processing unit 120A includes an optical modulator 131 and a signal generation unit 132, in addition to the WSS 121 and the control unit 122. The WSS 121 filters the input ASE light with parameters such as a transmission wavelength, a transmission band, and an attenuation amount that are set under an instruction from the control unit 122. The WSS 121 causes the ASE light having a frequency of a channel into which the dummy light is inserted to be transmitted, under an instruction from the control unit 122.

The spectrum processing unit 120A is different from the spectrum processing unit 120 in FIG. 2, and processes the spectrum of the ASE light in advance in such a way that the spectrum of the dummy light can be distinguished from the spectrum of the signal light on the time axis on the reception side. Thus, in the present example embodiment, the WSS 121 is not necessarily required to process the shape of the peak of the spectrum of the dummy light (for example, addition of the recess to the peak illustrated in FIG. 3).

The optical modulator 131 uses a modulation signal having a low frequency that is generated by the signal generation unit 132, and subjects the dummy light output from the WSS 121 to intensity modulation. In other words, the spectrum processing unit 120A superimposes the dummy light with a low frequency signal having a frequency f0. The frequency f0 of the modulation signal is set in such a way as not to affect data to be transmitted or an operation of a different device in the system in which the dummy light is transmitted. For example, the modulation signal is a sinusoidal signal having the frequency f0 that is 10 KHz to 1 MHz, inclusive. In general, power of the signal light does not have a low frequency component. Thus, when power of the received light in each channel has a low frequency component on the reception side, the light can be determined as the dummy light. When power of the light does not have a low frequency component, the light can be determined as the signal light.

Figure 10:
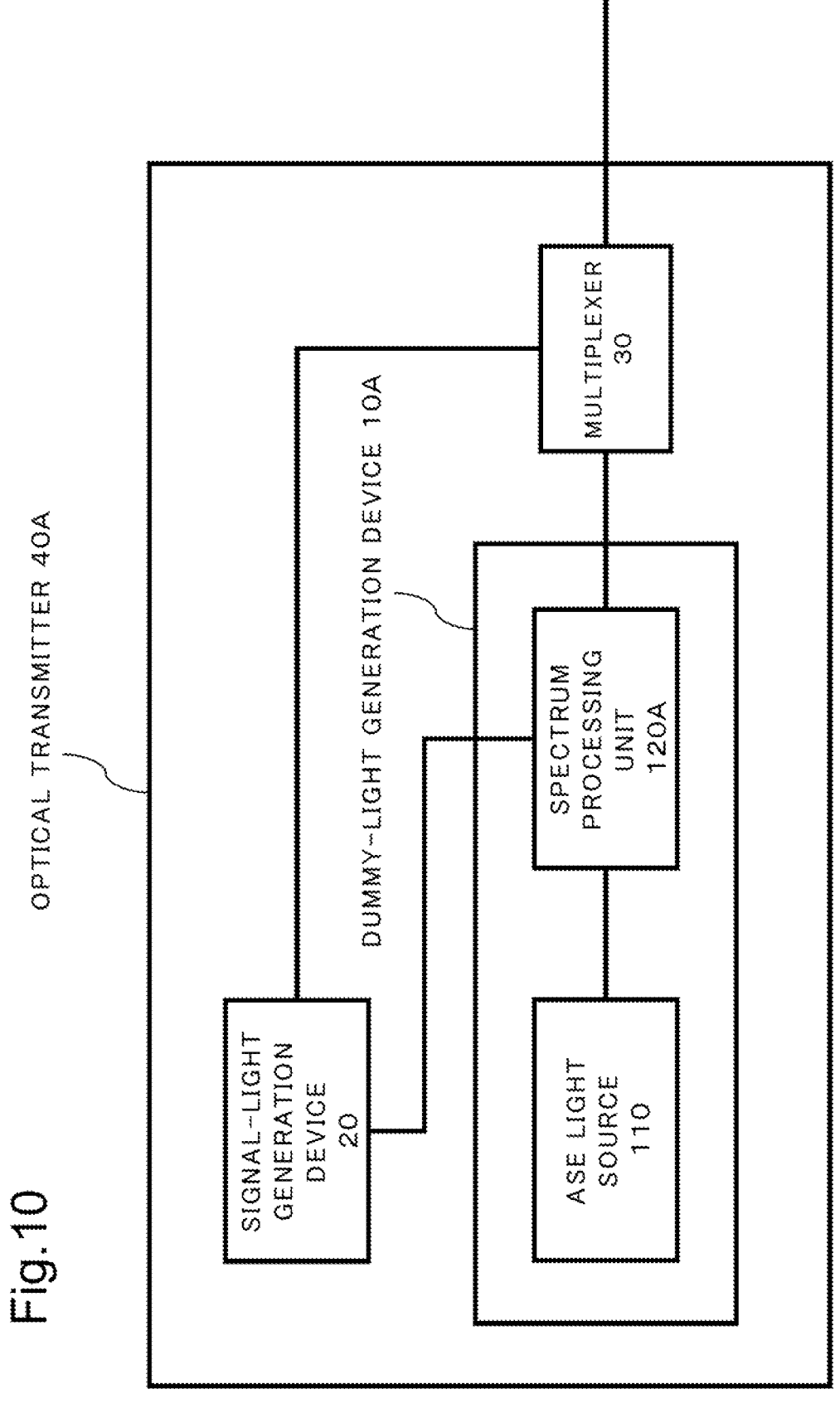
FIG. 10 is an exemplary diagram illustrating a configuration example of an optical transmitter of a third example embodiment.

FIG. 10 is an exemplary diagram illustrating a configuration example of an optical transmitter 40A of the third example embodiment. The optical transmitter 40A includes the signal-light generation device 20 and the multiplexer 30, which are described in FIG. 4, in addition to the dummy-light generation device 10A. The functions of the signal-light generation device 20 and the multiplexer 30 are similar to those of the optical transmitter 40. In other words, the signal-light generation device 20 generates the signal light modulated based on the user data or the control data. The multiplexer 30 outputs, to the outside of the optical transmitter 40A, the WDM signal acquired by subjecting the signal light and the dummy light to wavelength multiplexing. The spectrum processing unit 120A of the dummy-light generation device 10A subjects the dummy light to intensity modulation at a low frequency.

The dummy-light generation device 10A generates the dummy light having a wavelength that does not overlap with the signal light. The signal-light generation device 20 may notify the spectrum processing unit 120A of information relating to a channel allocated to the signal light. The spectrum processing unit 120A generates the dummy light in a slot other than the slot allocated to the signal light, based on the notified information. Further, the spectrum processing unit 120A may set the power of the dummy light, based on the notified information, in such a way that the total power of the dummy light or the total power of the WDM signal falls within a predetermined range.

Figure 11:
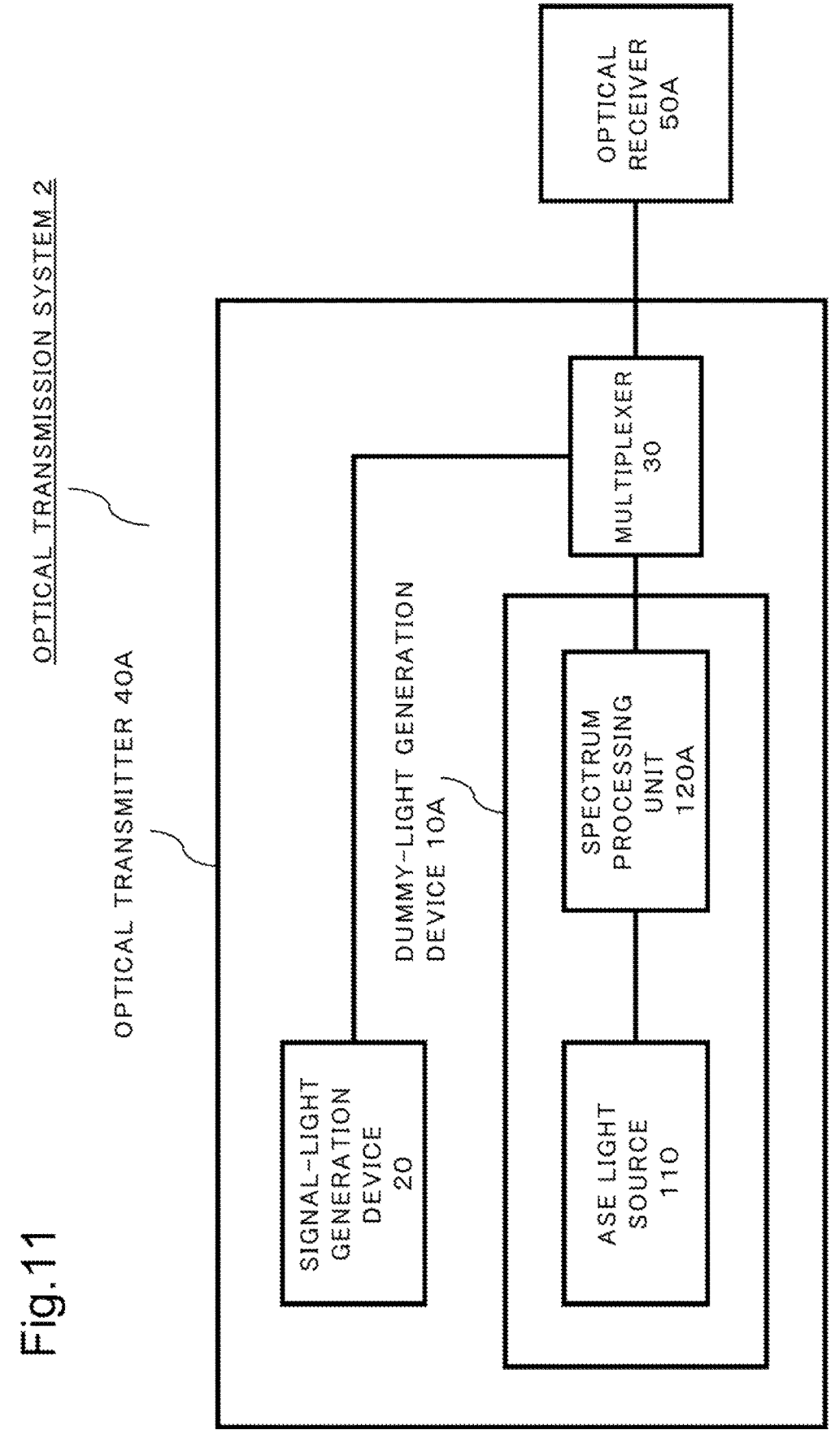
FIG. 11 is an exemplary block diagram illustrating a configuration example of an optical transmission system of the third example embodiment.

FIG. 11 is an exemplary block diagram illustrating a configuration example of an optical transmission system 2 of the third example embodiment of the present invention. The optical transmission system 2 includes the optical transmitter 40A and an optical receiver 50A. The WDM signal output from the optical transmitter 40A is received by the optical receiver 50A.

The optical receiver 50A extracts the distinction information from the spectrum difference in the WDM signal (received light) including the dummy light and the signal light. In the present example embodiment, the spectrum difference is a difference between the spectra of the signal light and the dummy light included in the WDM signal on the time axis. In other words, the optical receiver 50A determines whether the received light spectrum of the WDM signal in each channel has a temporal power variation of the low frequency component f0 for each channel.

The low frequency signal superimposed with the dummy light is an example of the distinction information. The optical receiver 50A measures the spectrum of the WDM signal, and determines the light with power having a predetermined frequency variation (distinction information) as the dummy light. Specifically, in a case in which the dummy light is subjected to intensity modulation at the frequency f0, when light included in a certain channel has a power variation of f0, the optical receiver 50A may determine the light in the slot as the dummy light. Further, when the light present in a certain channel does not have a power variation of f0, the light in the channel may be determined as the signal light.

The optical receiver 50A is one mode of the optical reception means. The optical receiver 50A may be provided to another terminal station with respect to a terminal station provided with the optical transmitter 40A. The optical transmitter 40A and the optical receiver 50A may be connected via an optical submarine cable. The optical receiver 50A may include a function of separating the signal light from the WDM signal and demodulating the user data or the control data. Alternatively, the optical receiver 50A may be provided to a terminal station being the terminal station provided with the optical transmitter 40A. In this case, the optical receiver 50A may be used as a monitoring device that splits and receives part of the WDM signal transmitted from the optical transmitter 40A and monitors the spectrum of the WDM signal transmitted from the optical transmitter 40A.

Figure 12:
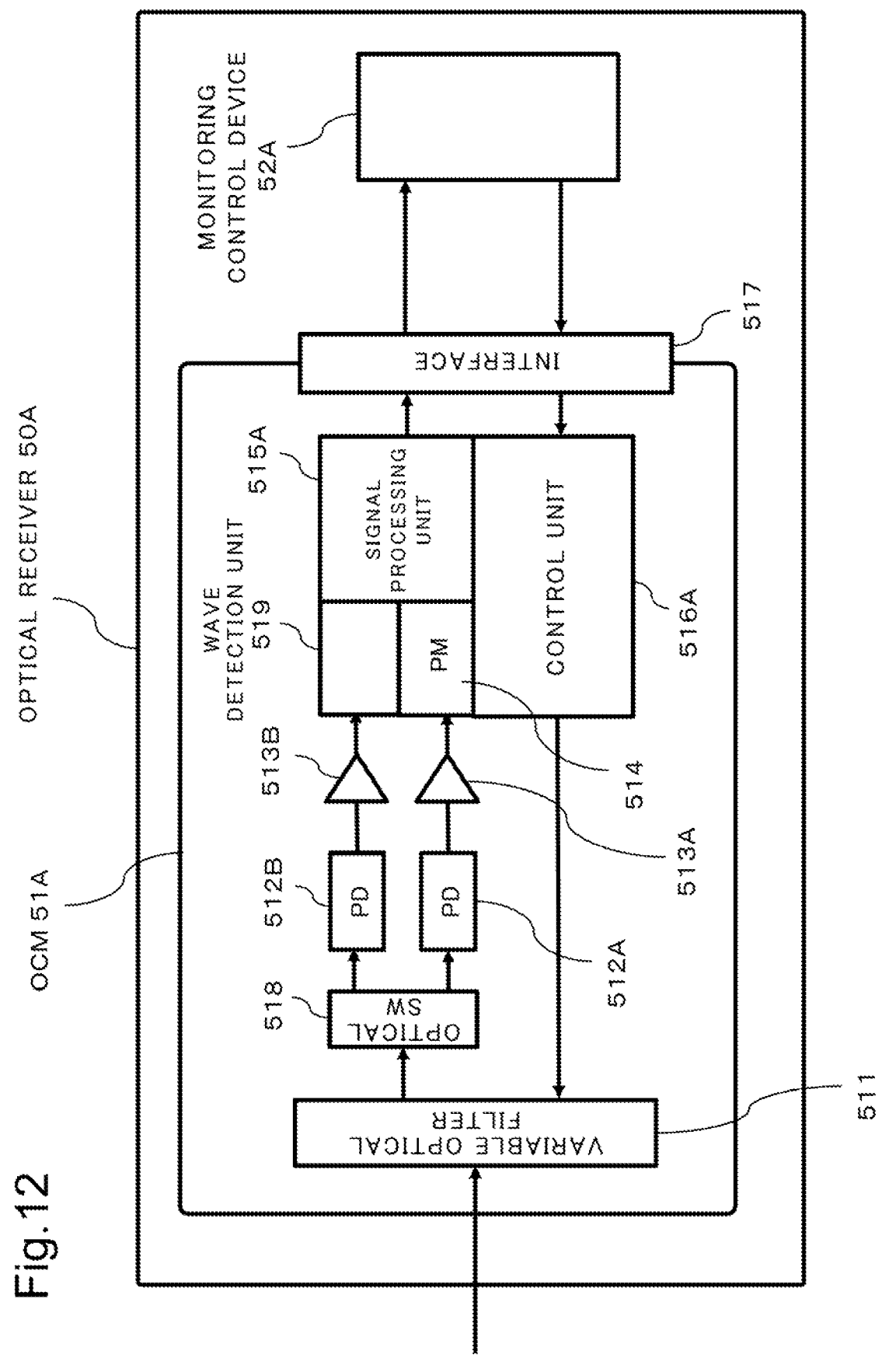
FIG. 12 is an exemplary block diagram illustrating a configuration example of an optical receiver.

FIG. 12 is an exemplary block diagram illustrating a configuration example of the optical receiver 50A used in the optical transmission system 2 in FIG. 11. The optical receiver 50A includes an OCM 51A and a monitoring control device 52A. The OCM 51A outputs the spectrum data relating to the input WDM signal to the monitoring control device 52A, under an instruction from the monitoring control device 52A. The monitoring control device 52A displays the spectrum data input from the OCM 51A as a waveform or a letter on a display screen or the like. In other words, the OCM 51A and the monitoring control device 52A implements a function as an optical spectrum analyzer.

The configuration and the function of the OCM 51A of the present example embodiment are described. In the following description, differences from the OCM 51 described in FIG. 8 are mainly given, and the configuration and the function that are similar to those of the OCM 51 are omitted in description as appropriate. The OCM 51A includes the variable optical filter 511, an optical switch (SW) 518, PDs 512A and 512B, AD conversion units 513A and 513B, the PM 514, a wave detection unit 519, a signal processing unit 515A, a control unit 516A, and the interface 517.

A transmission wavelength and a transmission band width of the variable optical filter 511 are set under an instruction from the control unit 516A. The optical SW 518 is a 1×2 optical switch, and outputs, to the PD 512A or the PD 512B, the light filtered by the variable optical filter 511.

For example, the PDs 512A and 512B are photo diodes, and generate an electric signal having an amplitude associated with power of the light passing through the variable optical filter 511. Outputs from the PDs 512A and 512B is converted into a digital signal by the AD conversion units 513A and 513B, respectively. The PM 514 acquires, from the digital signal input from the AD conversion unit 513A, power of the light input to the PD 512A, and outputs the resultant to the signal processing unit 515A. The wave detection unit 519 directly performs wave detection for the digital signal input from the AD conversion unit 513B, and extracts a temporal power variation of the light received by the PD 512B. The wave detection unit 519 outputs the extracted power variation to the signal processing unit 515A.

The signal processing unit 515A outputs the spectrum data to the monitoring control device 52A via the interface 517. The spectrum data contain data in which the power acquired by the PM 514 and a slot number of a transmission band of the variable optical filter 511 at the time of acquiring the power are associated with each other.

The signal processing unit 515A acquires a frequency of a power variation for each slot from the power variation notified from the wave detection unit 519. When it can be determined that a frequency of a power variation that is acquired in a certain slot matches with the frequency of the low frequency signal used for intensity modulation of the dummy light, the signal processing unit 515A determines the light in the slot as the dummy light. The determination result is added to the spectrum data as information indicating whether the received light is the dummy light for each slot. In other words, the spectrum data output from the OCM 51A contain information indicating whether the dummy light is present for each slot.

Each of the PM 514, the signal processing unit 515A, the control unit 516A, and the wave detection unit 519 is an electric circuit such as LSI, and those functions of the electric circuit may be implemented by the CPU or the DSP.

The monitoring control device 52A outputs, to the OCM 51A, a request signal being a signal for requesting the spectrum data relating to the WDM signal that is input to the OCM 51A. In response to an input of the request signal, the control unit 516A scans a transmission band of the variable optical filter 511 over a band of the WDM signal. The signal processing unit 515A generates the spectrum data, and outputs the resultant to the monitoring control device 52A. As described above, the spectrum data contain information whether the light of the WDM signal in each channel is the dummy light, in addition to the data relating to the spectrum of the WDM signal.

The monitoring control device 52A outputs the spectrum data input via the interface 517 of the OCM 51A in a format that can be recognized by an operator. The monitoring control device 52A may include a display screen, and may visually display the spectrum of the WDM signal while expressing the spectrum data with a frequency or a wavelength as a horizontal axis and power as a vertical axis.

Herein, the spectrum data output from the OCM 51A contains information whether the light in each channel is the signal light or the dummy light. Thus, the monitoring control device 52A is capable of displaying the spectrum in the slot that is determined as the dummy light by a means different from that for the signal light. For example, the monitoring control device 52A may display the spectrum of the dummy light in a color different from that for the signal light. Alternatively, a line indicating the spectrum of the dummy light may be a broken line or a flashing line on the display screen. In this manner, different display methods are used for the dummy light and the signal light, and thus an operator can easily distinguish the dummy light and the signal light from each other even when it is difficult for an operator to visually recognize a difference between the spectrum shapes.

Figure 13:
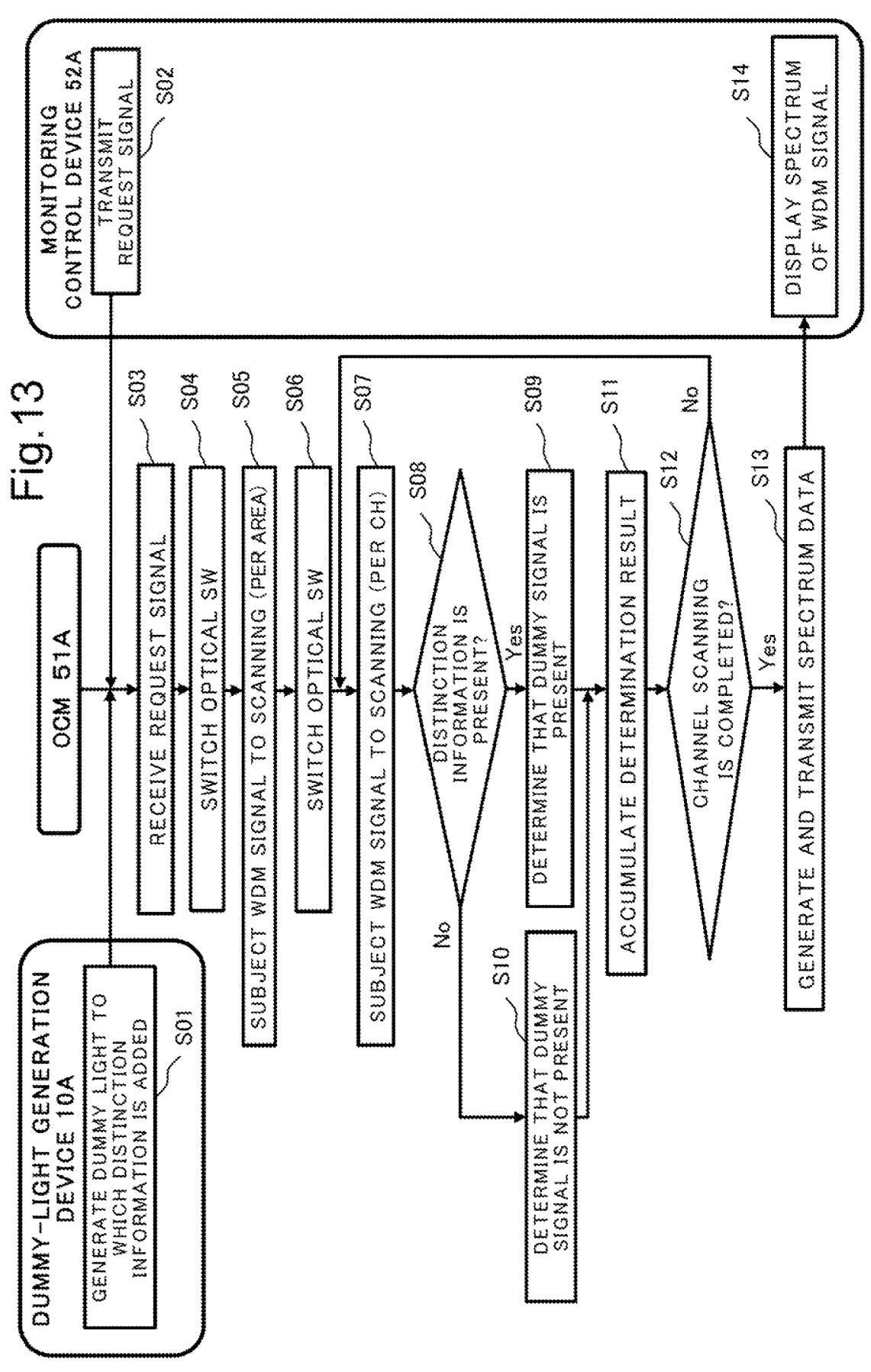
FIG. 13 is an exemplary flowchart illustrating an example of an operation procedure of the optical transmission system of the third example embodiment.

FIG. 13 is an exemplary flowchart illustrating an example of an operation procedure of the optical transmission system 2 of the third example embodiment. The dummy-light generation device 10A generates the dummy light to which the distinction information is added (S01 in FIG. 13). In the present example embodiment, addition of the distinction information is performed through intensity modulation for the dummy light through use of the optical modulator 131. The dummy light is transmitted as the WDM signal acquired by subjecting the signal light to wavelength multiplexing.

The WDM signal is received by the OCM 51A. After the WDM signal is received, the monitoring control device 52A transmits a signal (request signal) to the OCM 51A for instructing generation of the spectrum data (S02). An operator may operate the monitoring control device 52A to transmit the request signal after confirming that the OCM 51A received the WDM signal. The request signal is received by the control unit 516A of the OCM 51A. When the request signal is received (S03), the control unit 516A firstly switches the optical SW 518 in such a way that an output of the variable optical filter 511 is received by the PD 512A (S04). Then, the spectrum of the received WDM signal is measured (S05). In Step S05, a transmission band of the variable optical filter 511 is subjected to scanning in a relatively narrow band (area). For example, the band of the WDM signal from 191.3 THz to 196.1 THz is divided into 776 areas by a slice width of 6.25 GHZ. The variable optical filter 511 subsequently causes the WDM signal to pass therethrough for each area while changing a transmission frequency, and thus performs scanning for the WDM signal over the entire band. The PM 514 measures power of the light passing through the variable optical filter 511 for each area, and measures power for each of the 776 areas. With this procedure, the spectrum of the entire WDM signal can be acquired by the PM 514.

After measurement in Step S05 is completed, the OCM 51A subsequently examines whether the light includes the distinction information for each channel, and thus determines whether the light in each channel is the dummy light or the signal light. Thus, the control unit 516A switches the optical SW 518 in such a way that an output of the variable optical filter 511 is received by the PD 512B (S06). For examination of presence or absence of the distinction information, a transmission band of the variable optical filter 511 is subjected to scanning per channel (S07).

A band for scanning in Step S07 is wider than that in Step S05. For example, in Step S07, the wave detection unit 519 detects a variation of power of the light output from the variable optical filter 511 for each channel in a band width of 50 GHz. The light after scanning is subjected to wave detection by the wave detection unit 519.

With the procedure in Step S07, the wave detection unit 519 detects presence or absence of a temporal variation (in other words, presence or absence of the distinction information) of power for each channel. When an intensity variation of the measured light in a channel has the frequency f0 of the low frequency signal superimposed with the dummy light (S08: YES), the light in the channel is determined as the dummy light (S09). In contrast, when the light in the channel does not have the frequency f0 of the low frequency signal (S08: NO), the light in the channel is not determined as the dummy light (S10). The determination result is given as "DL=1" when light in a certain channel n is the dummy light, and the determination result is given as "DL=0" when the dummy light is not present. Further, data indicating whether light in a slot n (n is a natural number equal to or smaller than the number of slots of the WDM signal) is the dummy light or not are accumulated as DL (n)=1 or DL (n)=0 (S11).

When scanning is completed for all the channels for determination of the dummy light (S12: YES), the signal processing unit 515A adds the data DL (n) to the spectrum of the entire WDM signal that is acquired in Step S04, and thus generates the spectrum data. Then, the signal processing unit 515A transmits the generated spectrum data to the monitoring control device 52A (S13).

The monitoring control device 52A uses the spectrum data received from the signal processing unit 515A, and visually displays the spectrum of the WDM signal (S15). The slot number n is associated with a frequency (or a wavelength)

of the WDM signal, and hence the monitoring control device 52A is capable of displaying the signal light and the dummy light in a distinguishable manner in accordance with a value of the data DL (n).

The dummy-light generation device 10A, the optical transmitter 40A, and the optical transmission system 2 that are described in the third example embodiment facilitate distinction between the signal light and the dummy light included in the WDM signal. This is because the dummy-light generation device 10A processes the spectrum of the ASE light in advance on the time axis, and thus the device that receives the WDM signal can distinguish the signal light and the dummy light from each other, based on presence or absence of the processing.

Note that, a part or the entirety of the example embodiments described above may be described as in the following supplementary notes, but is not limited to the following.

(Supplementary Note 1)

A dummy-light generation device including:

an amplified spontaneous emission (ASE) light source that generates ASE light; and a spectrum processing means that extracts, from a spectrum of the ASE light, a wavelength band with no signal light and generates dummy light, wherein the spectrum processing means processes a spectrum of the dummy light in advance in such a way that, in a mixed spectrum including the dummy light and the signal light, the dummy light and the signal light can be distinguished from each other on at least one of a frequency axis and a time axis.

(Supplementary Note 2)

The dummy-light generation device according to Supplementary Note 1, wherein the spectrum processing means generates the dummy light by deforming a spectrum shape of the ASE light.

(Supplementary Note 3)

The dummy-light generation device according to Supplementary Note 1 or 2, wherein the spectrum processing means generates the dummy light by subjecting the ASE light to intensity modulation.

(Supplementary Note 4)

The dummy-light generation device according to any one of Supplementary Notes 1 to 3, wherein the dummy light is generated in such a way that total power of the signal light in a band is constant.

(Supplementary Note 5)

An optical transmission system including:

the dummy-light generation device according to any one of Supplementary Notes 1 to 4; and an optical reception means that extracts information for distinguishing the signal light and the dummy light from each other from a spectrum difference in received light.

(Supplementary Note 6)

A dummy-light generation method including:

generating amplified spontaneous emission (ASE) light; and extracting, from a spectrum of the ASE light, a wavelength band with no signal light and generating dummy light, wherein a spectrum of the dummy light is processed in advance in such a way that, in a mixed spectrum including the dummy light and the signal light, the dummy light and the signal light are distinguished from each other on at least one of a frequency axis and a time axis.

(Supplementary Note 7)

The dummy-light generation method according to Supplementary Note 6, further including generating the dummy light by deforming a spectrum shape of the ASE light.

(Supplementary Note 8)

The dummy-light generation method according to Supplementary Note 6 or 7, further including generating the dummy light by subjecting the ASE light to intensity modulation.

(Supplementary Note 9)

The dummy-light generation method according to any one of Supplementary Notes 6 to 8, further including generating the dummy light in such a way that total power of the signal light in a band is constant.

(Supplementary Note 10)

An optical transmission method including:

a procedure of the dummy-light generation method according to any one of Supplementary Notes 6 to 9; and a procedure of extracting information for distinguishing the signal light and the dummy light from each other from a spectrum difference in received light.

(Supplementary Note 11)

A dummy-light generation program causing a computer of a dummy-light generation device to execute a procedure of generating ASE light and a procedure of generating dummy light transmitted together with signal light by processing a spectrum of the ASE light, and including a procedure of processing the spectrum of the ASE light in advance in such a way that a spectrum of the dummy light and a spectrum of the signal light can be distinguished from each other on at least one of a frequency axis and a time axis on a reception side.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

A part or an entirety of an operation of each of the dummy-light generation device, the OCM, and the monitoring control device in each of the example embodiments may be programmed. Further, those devices may include a computer that executes a program. The computer executes the program, and thus may implement a part or an entirety of the functions described in each of the example embodiments. For example, the computer is a logical device, a CPU, or a DSP. Further, the program may be stored in a fixed-type recording medium that is computer-readable and non-temporal. For example, the recording medium is a flexible disk, a fixed-type magnetic disk, or a non-volatile semiconductor memory. The program may be distributed via a network.

Further, the configurations described in the example embodiments are not necessarily mutually exclusive. The actions and the effects of the present invention may be achieved in a configuration by combining the entirety or a part of the example embodiments described above.

For example, the procedure for providing the distinction information on the frequency axis, which is described in the second example embodiment, and the procedure for providing the distinction information on the time axis, which is described in the third example embodiment, may be executed in combination. Both the procedures are combined with each other, and thus the dummy light and the signal light can be distinguished from each other more accurately even under an environment with much noise or distortion of an optical signal.

REFERENCE SIGNS LIST

1, 2 Optical transmission system
10, 10A, 100 Dummy-light generation device
20 Signal-light generation device
30 Multiplexer
40, 40A Optical transmitter
50, 50A Optical receiver
52, 52A Monitoring control device
110 ASE light source
120, 120A Spectrum processing unit
122 Control unit
131 Optical modulator
132 Signal generation unit
511 Variable optical filter
512, 512A, 512B PD
513, 513A, 513B AD conversion unit
515, 515A Signal processing unit
516, 516A Control unit
517 Interface
518 Optical switch (SW)
519 Wave detection unit

The invention claimed is:

1. A dummy-light generation device comprising:
an amplified spontaneous emission (ASE) light source configured to generate ASE light; and
a spectrum processing unit configured to extract, from a spectrum of the ASE light, a wavelength band including no signal light and generate dummy light, wherein:
the signal light includes carriers that are assigned to slots, and
the spectrum processing unit is configured to process a spectrum of the dummy light in advance in such a way that, in a mixed spectrum including the dummy light and the signal light, the dummy light and the signal light can be, for each slot, distinguished from each other on at least one of a frequency axis and a time axis.

2. The dummy-light generation device according to claim 1, wherein the spectrum processing unit is configured to generate the dummy light by deforming a spectrum shape of the ASE light.

3. The dummy-light generation device according to claim 2, wherein the spectrum processing unit is configured to generate the dummy light by performing intensity modulation to the ASE light to intensity modulation.

4. The dummy-light generation device according to claim 2, wherein the dummy light is generated in such a way that total power in a band of the signal light is constant.

5. The dummy-light generation device according to claim 1, wherein the spectrum processing unit is configured to generate the dummy light by performing intensity modulation to the ASE light.

6. The dummy-light generation device according to claim 5, wherein the dummy light is generated in such a way that total power in a band of the signal light is constant.

7. The dummy-light generation device according to claim 1, wherein the dummy light is generated in such a way that total power in a band of the signal light is constant.

8. An optical transmission system comprising:
a dummy-light generation device comprising:
an amplified spontaneous emission (ASE) light source configured to generate ASE light; and
a spectrum processing unit configured to extract, from a spectrum of the ASE light, a wavelength band including no signal light and generate dummy light, wherein:
the signal light includes carriers that a assigned to slots, and
the spectrum processing unit is configured to process a spectrum of the dummy light in advance in such a way that, in a mixed spectrum including the dummy light and the signal light, the dummy light and the signal light can be, for each slot distinguished from each other on at least one of a frequency axis and a time axis; and
an optical receiver configured to extract information for distinguishing the signal light and the dummy light from each other from a spectrum difference in received light including the dummy light and the signal light.

9. The optical transmission system according to claim 8, wherein the spectrum processing unit is configured to generate the dummy light by deforming a spectrum shape of the ASE light.

10. The optical transmission system according to claim 8, wherein the spectrum processing unit is configured to generate the dummy light by performing intensity modulation to the ASE light.

11. The optical transmission system according to claim 8, wherein the dummy light is generated in such a way that total power in a band of the signal light is constant.

12. A dummy-light generation method comprising:
generating amplified spontaneous emission (ASE) light; and
extracting, from a spectrum of the ASE light, a wavelength band including no signal light and generating dummy light, wherein:
the signal light includes carriers that are assigned to slots, and
a spectrum of the dummy light is processed in advance in such a way that, in a mixed spectrum including the dummy light and the signal light, the dummy light and the signal light are, for each slot, distinguished from each other on at least one of a frequency axis and a time axis.

13. The dummy-light generation method according to claim 12, further comprising generating the dummy light by deforming a spectrum shape of the ASE light.

14. The dummy-light generation method according to claim 13, further comprising generating the dummy light by subjecting the ASE light to intensity modulation.

15. The dummy-light generation method according to claim 13, further comprising generating the dummy light in such a way that total power in a band of the signal light is constant.

16. The dummy-light generation method according to claim 12, further comprising generating the dummy light by subjecting the ASE light to intensity modulation.

17. The dummy-light generation method according to claim 16, further comprising generating the dummy light in such a way that total power in a band of the signal light is constant.

18. The dummy-light generation method according to claim 12, further comprising generating the dummy light in such a way that total power in a band of the signal light is constant.

* * * * *